United States Patent [19]

Henricson

[11] 4,333,800
[45] Jun. 8, 1982

[54] METHOD FOR THE RECOVERY OF EASILY EVAPORABLE COMPONENTS FROM HOT GASES

[75] Inventor: Kaj O. Henricson, Kaskö, Finland

[73] Assignee: Rosenblad Corporation, Princeton, N.J.

[21] Appl. No.: 2,686

[22] Filed: Jan. 11, 1979

Related U.S. Application Data

[63] Continuation of Ser. No. 746,676, Dec. 2, 1976, abandoned.

[51] Int. Cl.³ .............................................. B01D 3/14
[52] U.S. Cl. ..................................... 203/87; 202/236; 159/13 B; 159/47 WL; 159/28 C
[58] Field of Search .................. 159/13 R, 13 B, 2 R, 159/28 R, 28 C, 47 WC, 27 R, 1 C, 17 R; 203/87, 22, 23, 25; 202/236

[56] References Cited

U.S. PATENT DOCUMENTS

| | | | |
|---|---|---|---|
| 724,511 | 3/1903 | Schutt | 159/13 B |
| 2,215,189 | 9/1940 | Peterson | 203/87 |
| 2,832,802 | 4/1958 | Kohn | 203/87 |
| 3,195,515 | 7/1965 | Blizard | 55/343 |
| 3,261,392 | 7/1966 | Jacoby | 159/17 R |
| 3,351,119 | 11/1967 | Rosenblad | 202/236 |
| 3,366,158 | 1/1968 | Rosenblad | 202/236 |
| 3,401,096 | 9/1968 | Wondrak | 203/87 |
| 4,076,576 | 2/1978 | Marttala et al. | 159/17 R |
| 4,216,002 | 8/1980 | Rosenblad | 159/13 B |

Primary Examiner—Norman Yudkoff
Attorney, Agent, or Firm—Brooks, Haidt, Haffner & Delahunty

[57] ABSTRACT

A method for the recovery of heat and easily evaporable components from hot gases in which a liquid flowing downwards along heat exchanger surfaces is simultaneously heated indirectly, the hot gases are fed into the lower section of a gas space, blast gas containing evaporable components is removed at the upper section of the gas space, and a condensate derived from the hot gases is removed at the bottom of the gas space, comprising further bringing the blast gases into one or several indirect heat exchange contacts with the liquid, in successive additional gas spaces, recovering condensate accumulated at the bottoms of these additional spaces, and withdrawing the blast gases from the last additional gas space.

2 Claims, 6 Drawing Figures

4,333,800

METHOD FOR THE RECOVERY OF EASILY EVAPORABLE COMPONENTS FROM HOT GASES

This is a continuation of application Ser. No. 746,676, filed Dec. 2, 1976 and now abandoned.

BACKGROUND OF THE INVENTION

The present invention relates to a method and apparatus for the recovery of heat and easily evaporable components, such as methanol and turpentine, from hot gases, especially from the expansion vapors of waste liquor. This invention relates especially to a method and apparatus for the fractionation of the condensates in connection with the evaporation of liquids, and it is intended mainly for the pre-evaporation of a waste liquor, such as sulfate black liquor, emerging from a continuous-working digester, whereby the black liquor is concentrated from approx. 15–18% to approx. 23–25% in film-evaporation devices working according to the falling film principle, by using for the evaporation the so-called digestion buffer vapor.

In the continuous-working cellulose digester currently in use, the black liquor passing into the evaporator is taken out at a minimum absolute pressure of approx. 8 atm. and at a temperature of approx. 170° C. Thus it contains a considerable amount of thermal energy, which can be utilized in the process.

So far the black liquor has usually been pre-evaporated first by lowering the pressure during two successive expansion stages so that a liquor vapor at approx. 120° C., suitable for the expansion of digestion chips, is obtained from the first stage, and the vapor at approx. 100° C. generated during the second stage is used for heating water. At this time the temperature of the liquor is approx. 100° C., which is regarded as a suitable inlet temperature for the final evaporation. The final evaporation is performed in a multi-stage evaporator based on the indirect transfer of heat; in this case, fresh vapor which yields the thermal energy required by the process is fed to the first stage. Such a use of heat is not as economic as it could be.

If the digester expansion vapor is used as one source of heat for the black-liquor evaporator, the need for fresh vapor decreases. Advantages are also gained in terms of environmental protection.

The use of black-liquor expansion vapor for the pre-evaporation in the buffer evaporator is known per se from, for example, U.S. Pat. No. 3,286,763, and an evaporator suitable for this purpose has been introduced in patent application Ser. No. 644,714; this contains laminae inside which heating vapor is fed and which serve as heat exchangers. The liquid to be evaporated is caused to flow onto the outer surfaces of the laminae, where it flows downwards. The direction of the vapor flow is also downwards and the produced condensate is removed at the lower part of the apparatus. One object of this invention is to make the fractionation of the condensates of such a buffer evaporator more effective.

In the evaporation of black liquor the easily evaporable components are removed along with the vapor flow during the first evaporating stages. If a pre-evaporator, for example, a buffer evaporator, is available, a large proportion of these easily evaporable components is separated from the black liquor in the pre-evaporator and is condensed together with the outlet vapor. The evaporating components in the evaporator thus pass from the liquor into the condensate. Because the quantities of these components, especially of methanol and turpentine, are large and for environmental reasons must be removed from the condensate before it is released into the watercourse, they must be separated from the condensate water. This separation requires a stripping column into which fresh vapor is fed.

The object of the present invention is to provide a more economic method and apparatus than previous ones for the recovery of heat and easily evaporable components from hot gases and vapors.

SUMMARY OF THE INVENTION

According to the invention the buffer vapors emerging from the heat exchanger are still exposed to an indirect heat exchange in one or several successive evaporators operating according to the cocurrent or the countercurrent principle, the liquid to be evaporated flowing downwards along the heat exchanger surfaces of the evaporator. Thereby the heat contained in the hot gases can be used effectively for the evaporation of the liquid and the easily evaporable components present in these gases can still be separated from the other condensates.

DESCRIPTION OF THE PREFERRED EMBODIMENTS

Figures 1, 2:
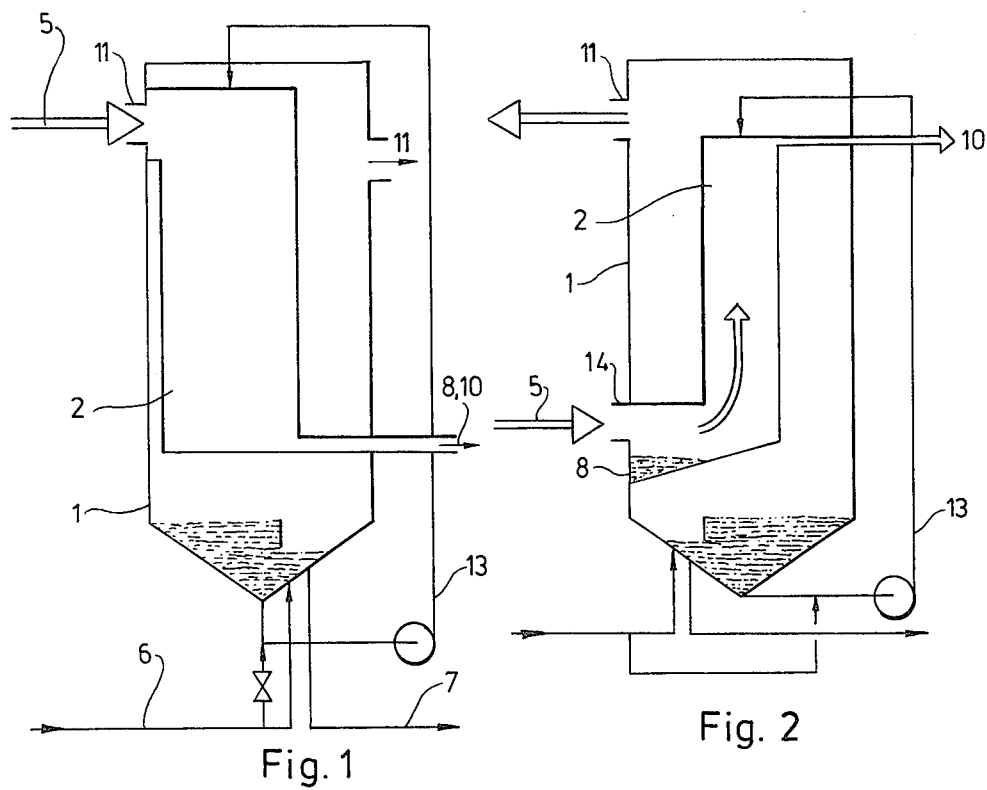
FIGS. 1 and 2 depict two known evaporation units as diagrammatic cross sections.

FIG. 1 shows an evaporation unit 1 known from U.S. patent application Ser. No. 644,714 now Pat. No. 4,076,576. Liquor to be evaporated is fed along the pipe 6 into its lower section, liquor concentrated by evaporation is removed along the pipe 7, and part of the liquor to be evaporat present in the evaporation unit 1 is removed along the pipe 13 and refed into the same evaporation unit 1, onto the heat exchanger 2 inside the unit, possibly together with a new liquor batch to be evaporated, so that this new and/or recycled liquor flows along the surfaces of the heat exchanger 2, whereby heat is transferred to the liquor.

Through the heat exchanger 2, heating vapor 5 is fed in through the inlet 14 in the upper section of the heat exchanger 2 in such a manner that the vapor flows in the heat exchanger downwards concurrently with the liquor to be evaporated, whereby a part 8 of the vapor is condensed, and this part 8 together with the through-blast vapor 10, i.e., the uncondensed part, is directed out at the lower section of the heat exchanger 2.

The vapors generated in the evaporation of the liquor are removed from the evaporation unit through the outlet 11 in its upper section.

A distillation effect is produced on the condensing vapor side by making arrangements for a condensate and vapor flow, and for a through-blast, also in a known manner, as shown in FIG. 2. The inlet vapor 5 and the outlet condensate 8 flow countercurrent in the laminae of the heat exchanger 2. The outlet condensate 8 is purified because it is in contact with the inlet vapor 5, in which the partial pressures of the easily evaporable components are at their lowest. The evaporating components accumulate in the upper section of the laminae of the heat exchanger 2, from where they are removed by a through-blast. A heat-exchanger lamina thus serves as a kind of distillation device.

It has been observed that in the apparatus shown in FIG. 2 the methanol present in the inlet vapor 5 is distributed in the following manner, depending on the amount of the through-blast 10:

| Through-blast 10 | Methanol distribution | |
|---|---|---|
| % of inlet vapor 5 | In condensate 8 | In through-blast 10 |
| 10% | 33% | 67% |
| 20% | 23% | 77% |
| 30% | 19% | 81% |

If a recovery of 80% of the methanol is desired, 70% of the condensates of the inlet vapor do not require an additional treatment. In these evaporators, in which the vapor is fed into the upper section of the laminae and the condensate is removed by means of a through-blast at the lower ends of the laminae, 100% of the condensates of the inlet vapor require further treatment.

The known solution shown in FIG. 2 has, however, certain disadvantages, since the thermal energy of the thorugh-blast vapor 10 is not used for the evaporation of the liquor.

The object of the present invention is therefore to provide a method and apparatus in which the good points of the solutions illustrated in FIGS. 1 and 2 are combined, i.e., an effective utilization of the condensation energy of the inlet vapor 5 and its distilling effect when the vapor flows countercurrently in relation to the produced condensate 8.

Figures 3, 4:
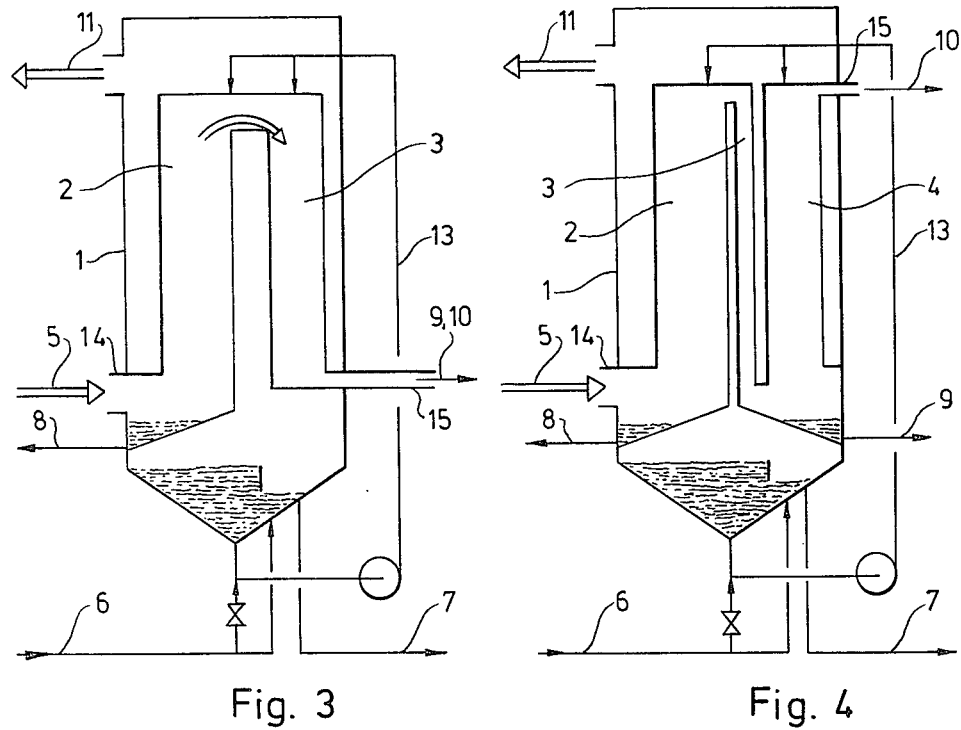
FIGS. 3–5 depict diagrammatic cross sections of three different embodiments of the invention.

According to the invention (FIG. 3), the heating vapor 5 is fed at the lower section of the first lamina group 2 through the inlet 14. From there it flows upwards countercurrently to the condensate 8, and at the upper section of the lamina group 2, that part of the vapor which has not condensed is removed and directed to the upper section of the second lamina group 3 in the same evaporation unit 1. From there it flows downwards cocurrently with the liquid to be evaporated. Here the condensate of the inlet vapor 5 is divided into two fractions 8 and 9, of which one 9 contains the bulk of the evaporable components. According to a more advantageous embodiment (FIG. 4), a third lamina group 4 is added to the same evaporation unit 1. The vapors to be blown through are fed from the second lamina group 3 to the lower section of the third lamina group 4; from there they flow upwards and are removed at the upper section of the lamina group 4 through the outlet 15. In this case the condensate of the inlet vapor 5 can be divided into three fractions, whereby the most important evaporable components of the black liquor, i.e., methanol and turpentine, are separated from each other.

It is evident that instead the second lamina group 3, a single pipe or parallel coupled pipes can be used for directing the gases emerging from the upper section of the lamina group 2 to the lower section of the lamina group 4. In this case the evaporation unit has two heat exchangers 2 and 4 operating according to the countercurrent principle, coupled in series, although the connecting pipe 3 also serves as a heat exchanger to some extent.

Figure 6:
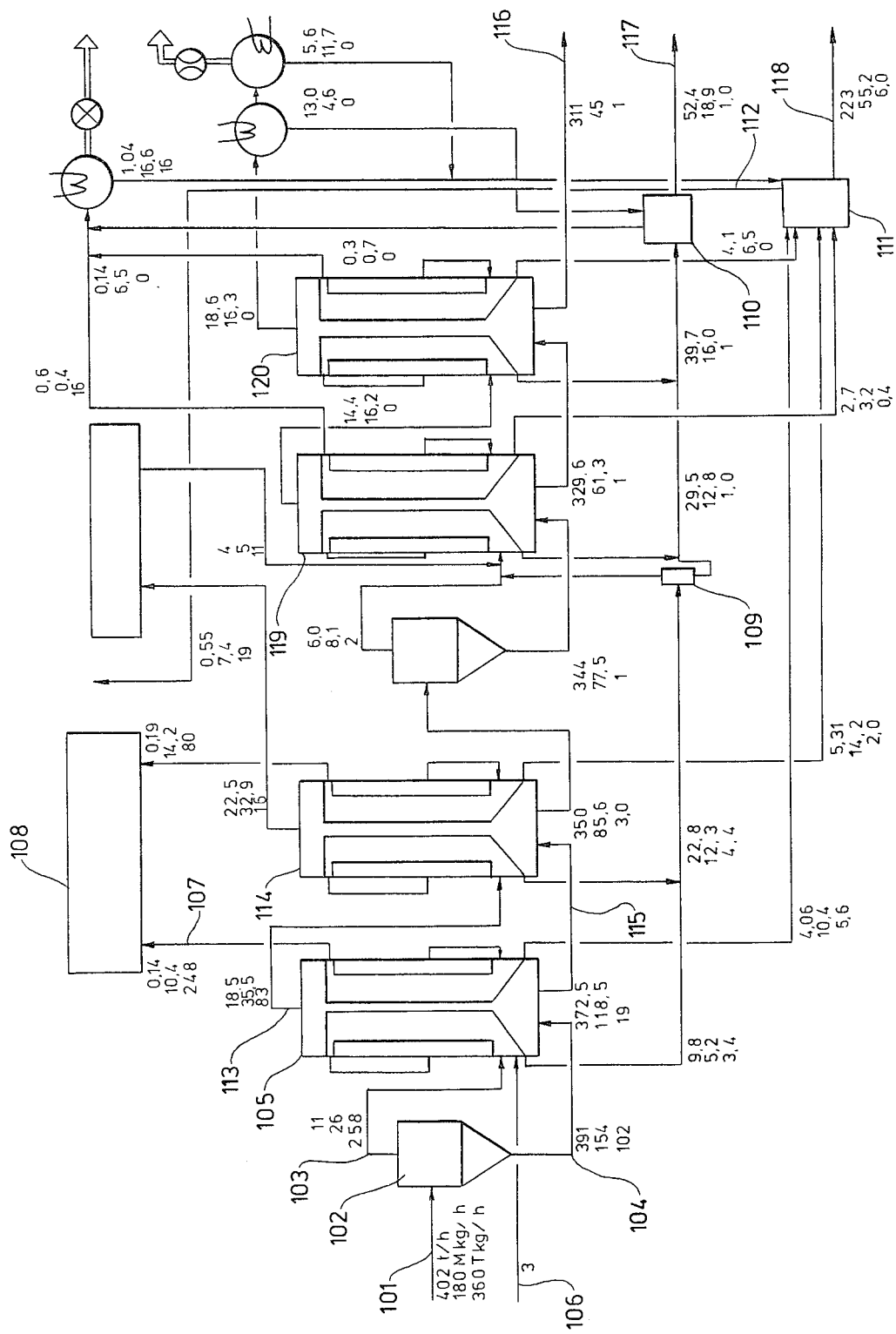
FIG. 6 illustrates a schematic coupling diagram of a sulfate black-liquor evaporation plant provided with evaporation units according to the invention.

The connecting pipe can also be led outside the evaporation unit from the lamina group 2 to the lamina group 4, as shown in FIG. 6.

In the pre-evaporation of black liquor, a suitable through-blast 10 in the first lamina group 2 is approx. 30% and in the second one 3 approx. 1% of the vapor entering the evaporation unit. In this case the methanol and turpentine are distributed as follows during the black liquor evaporation:

|  | Pure condensate 8 | Methanol condensate 9 | Through-blast 10 |
|---|---|---|---|
| methanol | 20% | 38% | 42% |
| Turpentine | 1.3% | 2.4% | 96.3% |
| Water | 70% | 29% | 1% |

The pure condensate 8 does not require any further treatment. The through-blast 10 is condensed in a turpentine condenser (not shown in the figure) and directed to turpentine separation, in which methanol and turpentine are separated from each other. The methanol from the turpentine separation is combined with the methanol condensate and fed into the stripper, where the methanol is separated from the water. Normally it would have been necessary to separate first the turpentine and then the methanol from the total condensate quantity.

Figure 5:
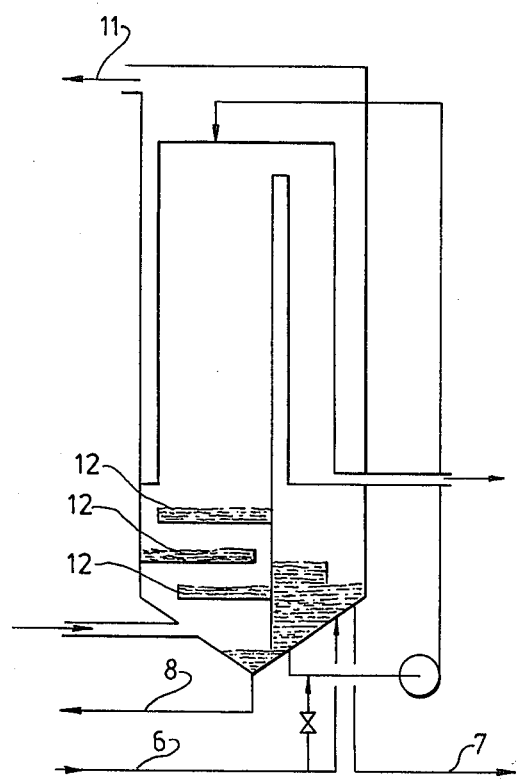

The distilling effect described above can be made more effective in the manner indicated in FIG. 5. In FIG. 5 there are, below the laminae 2, material-transfer trays 12 where the inlet vapor 5 strips the outlet condensates 8. This further promotes the collection of the easily evaporable gases at the top of the laminae. It has been observed concerning methanol that, if three trays 12 with an efficiency ratio of some 50% are added, 84% of the methanol can be caused to accumulate in a 10% through-blast 10.

FIG. 6 depicts a sulfate black liquor evaporation plant provided with buffer evaporators and with evaporation units according to the invention.

The black liquor 101 emerges from the digester at 170° C. It is fed into the expansion tank 102. From the expansion tank 102 the vapor 103 and the black liquor 104 are directed into the evaporator 105, into which fresh vapor 106 is also fed. From the evaporator 105 the turpentine through-blast 107 passes into the turpentine condenser 108. The pure condensate is fed through expansion tank 109 into the pure-condensate tank 110. The methanol condensate is fed into the methanol condensate tank 111, where it expands, and the expansion vapors 112 are directed into the turpentine condenser 108. The outlet vapor 113 from the evaporator 105 and the outlet black liquor 115 are fed into the next unit 114. As above, the black liquor then passes further through the units 119 and 120. The products obtained are a product black liquor 116, a pure condensate 117, and a methanol condensate 108. The turpentine vapors are collected in the turpentine condenser 108. It is unnecessary to feed the through-blasts from the units 119 and 120 into the turpentine condenser since their turpentine contents are already quite low. The bulk of the turpentine has been separated from the black liquor during the earlier stages.

FIG. 6 shows the water (t/h), methanol (Mkg/h), and turpentine (Tkg/h) balances of sulfate black liquor evaporation.

The total condensate rate is 300 t/h when the flow 101 in the buffer and final evaporator is evaporated to a dry-matter content of 65%. In FIG. 6 the flow into the turpentine condenser 108 is approx. 1 t/h. The turpentine is thus obtained in a flow which is approx. 0.3% of the total quantity of condensate. The turpentine recovery rate is nearly 98%. The methanol is collected from the condenser 111 into a condensate quantity which is 23 t/h, which is only 7.5% of the total condensate quantity. The methanol recovery rate is nearly 60%.

Since the recovery rates of methanol and turpentine are thus already high enough at the buffer evaporator, the condensates emerging from the final evaporator can be left untreated.

What is claimed is:

1. A method for the recovery of heat and easily evaporable components from methanol and turpentine-bearing vapor wherein such vapor from a single source of vapor is selectively condensed to produce two distinct and different condensates, a clean condensate and a condensate containing methanol, comprising the steps of:
   (a) feeding hot liquor from cellulose digestion to an expansion tank to separate a first stream of methanol and turpentine-bearing vapor from the liquor, which vapor is said vapor from a single source of vapor;
   (b) feeding said first vapor stream from a single source from step (a) to the section of a first gas space of an evaporator, expanding and feeding the liquor from step (a) to said evaporator as cooling liquor and passing said cooling liquor countercurrently to and in indirect heat exchange contact with said vapor in said first gas space to produce a clean condensate from said vapor which is relatively free of easily evaporable components while leaving some of said vapor uncondonsed;
   (c) removing said clean condensate from said evaporator and passing said uncondensed vapor into a second gas space of said evaporator to flow therethrough in concurrent indirect heat exchange contact and then in countercurrent indirect heat exchange contact with said cooling liquor, producing a second condensate from the vapor in said second gas space containing methanol and leaving uncondensed some vapor in said second gas space containing methanol and turpentine;
   (d) discharging said condensate containing methanol from said second gas space, and withdrawing said uncondensed vapor from said second gas space to a turpentine condenser for condensation of turpentine and separation of methanol therefrom and combining said separated methanol with the condensate from said second gas space and discharging cooling liquor from the evaporator.

2. The method of claim 1 and including repeating steps (b) and (c) before performing step (d).

* * * * *